US010771924B2

(12) United States Patent
Colonna et al.

(10) Patent No.: US 10,771,924 B2
(45) Date of Patent: Sep. 8, 2020

(54) METHOD AND SYSTEM FOR COUNTING PEOPLE AT A TRANSPORT HUB BY MEANS OF DATA OF A TELECOMMUNICATION NETWORK

(71) Applicant: TELECOM ITALIA S.p.A., Milan (IT)

(72) Inventors: Massimo Colonna, Turin (IT); Piero Lovisolo, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/472,572

(22) PCT Filed: Dec. 22, 2016

(86) PCT No.: PCT/EP2016/082342
§ 371 (c)(1),
(2) Date: Jun. 21, 2019

(87) PCT Pub. No.: WO2018/113968
PCT Pub. Date: Jun. 28, 2018

(65) Prior Publication Data
US 2019/0327581 A1    Oct. 24, 2019

(51) Int. Cl.
| | | |
|---|---|---|
| H04W 4/029 | (2018.01) | |
| H04W 4/42 | (2018.01) | |
| H04W 4/021 | (2018.01) | |
| H04W 4/02 | (2018.01) | |
| H04W 64/00 | (2009.01) | |

(52) U.S. Cl.
CPC ........... *H04W 4/029* (2018.02); *H04W 4/021* (2013.01); *H04W 4/023* (2013.01); *H04W 4/42* (2018.02); *H04W 64/006* (2013.01)

(58) Field of Classification Search
CPC ....... H04W 4/029; H04W 4/42; H04W 4/023; H04W 4/021; H04W 64/006; H04W 4/00;
(Continued)

(56) References Cited

U.S. PATENT DOCUMENTS 6,304,519 B1 * 10/2001 Druk .............................. 368/107
8,428,620 B2 * 4/2013 Sweeney et al. .......... 455/456.3
(Continued)

FOREIGN PATENT DOCUMENTS

WO    WO 2015/15839 A1    10/2015
WO    WO 2015/158399 A1    10/2015
(Continued)

OTHER PUBLICATIONS

International Search Report dated Mar. 1, 2017, in PCT/EP2016/082342 dated Dec. 22, 2016.
(Continued)

*Primary Examiner* — Meless N Zewdu
(74) *Attorney, Agent, or Firm* — Oblon, McClelland, Maier & Neustadt, L.L.P.

(57) ABSTRACT

A method of counting individuals reaching or leaving a transport hub includes defining at least two categories of individuals, each corresponding to a respective purpose to reach or leave the transport hub, and for each category, defining at least one respective category pattern associated with the category. Each category pattern is a sequence of events of interaction between a User Equipment and a communication station. The method also includes acquiring event records associated with User Equipment from the mobile telecommunication network, searching the event records associated with each User Equipment to identify sequences of events of interaction matching a category pattern, and upon finding a match, increasing a number of individuals belonging to the category associated with the category pattern.

18 Claims, 3 Drawing Sheets

(58) Field of Classification Search
CPC ....... H04W 4/02; H04W 64/00; H04W 4/028; H04W 4/025; H04W 60/00; H04W 60/005; H04W 60/02; H04W 60/04; H04W 60/06; H04W 88/00; H04W 88/02; H04W 88/08; H04W 88/16; H04W 4/24; H04W 4/30; H04W 4/38; H04W 92/08; H04W 92/00; G06Q 50/30; G06Q 50/26; G06Q 20/3224; G06Q 20/32; G06Q 30/0205; H04L 67/16; H04L 29/06823; H04L 29/06829; H04L 29/06836; H04L 12/12; H04L 29/06843; H04L 29/06857; H04L 29/06891; H04L 67/18; H04L 67/22; H04L 67/2857; G06M 3/00; G06M 3/04; Y10S 119/906; G06K 9/00362; G01S 2205/09; G01S 5/02

See application file for complete search history.

(56) References Cited

U.S. PATENT DOCUMENTS

| | | | |
|---|---|---|---|
| 8,612,278 B1 * | 12/2013 | Ashley, Jr. et al. | 705/7.25 |
| 9,955,299 B2 * | 4/2018 | Collona et al. | H04W 4/022 |
| 9,965,938 B1 * | 5/2018 | Cronin et al. | G08B 21/18 |
| 10,015,630 B2 * | 7/2018 | Reimer | H04W 4/023 |
| 10,285,006 B2 * | 5/2019 | Collona et al. | H04W 4/022 |
| 2004/0145658 A1 * | 7/2004 | Lev-Ran et al. | 348/143 |
| 2010/0138246 A1 * | 6/2010 | Carey et al. | 705/5 |
| 2015/0186497 A1 * | 7/2015 | Patton et al. | G06F 17/30598 |
| 2015/0248689 A1 * | 9/2015 | Paul et al. | G06Q 30/0222 |
| 2017/0041762 A1 * | 2/2017 | Colonna et al. | H04W 4/028 |
| 2018/0058872 A1 * | 3/2018 | Berhe et al. | G01C 21/3492 |

FOREIGN PATENT DOCUMENTS

| | | |
|---|---|---|
| WO | WO 2016/15576 A1 | 6/2016 |
| WO | WO 2016/155768 A1 | 6/2016 |
| WO | WO 2016/10764 A1 | 7/2016 |
| WO | WO 2016/107647 A1 | 7/2016 |

OTHER PUBLICATIONS

Furletti, B. et al., "Analysis of GSM calls data for understanding user mobility behavior", 2013, IEEE International Conference on Big Data, Silicon Valley, Oct. 6, 2013, pp. 550-555, XP002767315.

* cited by examiner

METHOD AND SYSTEM FOR COUNTING PEOPLE AT A TRANSPORT HUB BY MEANS OF DATA OF A TELECOMMUNICATION NETWORK

BACKGROUND OF THE INVENTION

Field of the Invention

The solution according to embodiments of the present invention refers to methods and systems implementing data analysis. In detail, the solution according to embodiments of the present invention relates to methods and systems for counting and classifying people in a predetermined area. In more detail, the solution according to the present invention relates to a method and a system for counting and classifying people passing by a transport hub (e.g., an airport, a railway station, a bus station, an underground station, etc.) by means of data of a telecommunication network.

Overview of the Related Art

Travels have a central role in human activities either considering business (e.g., trade) and private (e.g., tourism) activities. Indeed, modern travel vehicles and transports management allow reaching far locations in a reduced time, which is an important feature, for example, in a globalized market where employees, assets and customers of business/manufacturing companies are spread worldwide. Similarly, fast and relatively cheap transportation means allow people reaching even remote locations for tourism.

Therefore, operation efficiency of transport hubs has a substantial weight in determining an effectiveness of human activities (e.g., trade, tourism, etc.) in geographic regions where transport hubs are located and, also, in geographic regions reachable through such transport hubs.

Accordingly, a proper management of a generic transport hub—i.e. the management of the transport hub infrastructures, services and personnel—is fundamental for ensuring the required operation efficiency.

For an effective management of a transport hub, and for correctly sizing transport hub infrastructure, service and personnel, a knowledge of a number of people that may be found within an area of the transport hub as in-depth as possible is required.

Moreover, the knowledge of the purposes that lead people to the transport hub area may be particularly useful in improving the management of the transport hub.

Generally, transport companies possess data comprising exhaustive lists of freights and/or passengers for each transportation vehicle (e.g., aircraft, truck, train, bus, ship, etc.) departing and arriving at the transport hub, but such data are kept confidential, and not shared, for passengers/customers privacy and competition reasons. Therefore, such data cannot be exploited for improving the transport hub management.

Nevertheless, the data available to transport companies do not account for people that may be found at the transport hub, but are not meant to take a flight, train, bus, ship, such as for example (taxi) drivers, non-travelling partners of people that depart or arrive, personnel of the transport hub, etc.

In the art, several expedients have been proposed for analyzing people mobility behaviors.

For example, F. Manfredini, P. Pucci, P. Secchi, P. Tagliolato, S. Vantini, V. Vitelli, "Treelet decomposition of mobile phone data for deriving city usage and mobility pattern in the Milan urban region", MOX—Report No. 25/2052, MOX, Department of Mathematics "F. Brioschi", Politecnico di Milano, available at http://mox.polimi.it, discloses a geo-statistical unsupervised learning technique aimed at identifying useful information on hidden patterns of mobile phone use. These hidden patterns regard different usages of the city in time and in space which are related to individual mobility, outlining the potential of this technology for the urban planning community. The methodology allows obtaining a reference basis that reports the specific effect of some activities on the Erlang data recorded and a set of maps showing the contribution of each activity to the local Erlang signal. Results being significant for explaining specific mobility and city usages patterns (commuting, nightly activities, distribution of residences, non-systematic mobility) have been selected and their significance and their interpretation from a urban analysis and planning perspective at the Milan urban region scale has been tested.

B. Furletti, L. Gabrielli, C. Renso and S. Rinzivillo, "Analysis of GSM calls data for understanding user mobility behavior", 2013 IEEE International Conference on Big Data, Silicon Valley, Calif., 6-9 Oct. 2013, pp. 550-555, discloses that GSM calls data stored by the telecommunication operator in large volumes and with strict privacy constraints may be exploited for mobility behavior identification based on aggregated calling profiles of mobile phone users. The compact representation of user call profiles is the input of a mining algorithm for automatically classifying various kinds of mobility behavior. Having defined the call profiles allows basing an analysis phase on summarized privacy-preserving representation of the original data. These call profiles permit to design a two step process—implemented into a system—based on a bootstrap phase and a running phase for classifying users into behavior categories. The system has been tested in two case studies where individuals are classified into residents, commuters and visitors.

US 2015/0149087 discloses methods, systems, and apparatus, including computer programs encoded on computer storage media, for determining travel information. One of the methods includes obtaining flight information for each of a plurality of users, the flight having a flight identifier and associated with a particular scheduled departure time and departure location; based on the scheduled departure time, obtaining location information for user devices associated with each user of the plurality of users; determining that the respective user devices associated with a first group of users of the plurality of users, has a location associated with the departure location; determining that the respective mobile devices associated with users of the first group are no longer in communication with a mobile network; and using the respective times at which the user devices are determined to no longer be in communication with the mobile network along with the scheduled departure time to determine a departure time.

SUMMARY OF THE INVENTION

The Applicant has perceived that the known solutions provide unsatisfactory results, as they are not able to determine purposes that brought each individual to the transport hub.

Accordingly, the prior art generally lacks of methods and systems arranged for counting of people within the area of a transport hub and dividing such people into categories, according to a purpose of their presence at the transport hub.

The Applicant has observed that, generally, the expedients known in the art are not able to provide an analysis of people that happen to be within a transport hub area during a predetermined observation time period. Moreover, the known expedients are not able to differentiate among categories of people that are identified within the transport hub area.

The Applicant has therefore tackled the problem of how to associate each individual that reaches or leaves the transport hub to a respective category according to a purpose of his/her presence at the transport hub. The Applicant has found that it is possible to identify such purposes by analyzing movements of the individuals.

Preferably, the Applicant has found that movements within an area of people belonging to a same category have similar movement patterns within the area and, therefore, it is possible to associate an individual to a particular category when a corresponding movement pattern has been recognized in the movements of the individual.

The Applicant has further found that it is possible to exploit information regarding activities of user equipment owned/to be used by individuals, said information being available at a mobile communication network. Said information can be exploited in order to track individual movements and identify patterns as mentioned above, in an automated and reliable manner.

Particularly, one aspect of the present invention proposes a method of counting individuals reaching or leaving a transport hub. Said transport hub being included in a hub area comprised in a geographic area over which a mobile telecommunication network is adapted to manage communications of User Equipment owned/to be used by individuals. The mobile telecommunication network is configured for recording event records each one indicating at least a time information and a position information of each event of interaction between a User Equipment and the mobile telecommunication network. The method comprises defining at least two categories of individuals, each category corresponding to a respective purpose for which the individuals reach or leave the transport hub; for each category, defining at least one respective category pattern associated with the category, each category pattern being a sequence of events of interaction between a User Equipment and a communication station of the mobile telecommunication network; acquiring event records associated with User Equipment from the mobile telecommunication network; searching the event records associated with each User Equipment of a pool of User Equipment for identifying sequences of events of interaction matching a category pattern, and upon finding a match between a sequence of events and a category pattern, increasing a number of individuals belonging to the category associated with the category pattern.

Preferred features of the present invention are set in the dependent claims.

In one embodiment of the present invention, acquiring event records associated with User Equipment from the mobile telecommunication network comprises defining a predetermined observation time, and preferably acquiring event records associated with User Equipment having a time information referred to a time instant comprised in the predetermined observation time period.

In one embodiment of the present invention, acquiring event records associated with User Equipment from the mobile telecommunication network comprises defining the hub area as a portion of the geographic area comprising the transport hub, and preferably acquiring event records associated with User Equipment whether at least one event record thereof has a position information referred to a position within the hub area.

In one embodiment of the present invention, defining at least one category pattern of events associated with each category comprises defining at least one category pattern of events comprising at least one event recorded in a position within the hub area.

In one embodiment of the present invention, defining at least one category pattern of events associated with each category further comprises defining at least one category pattern of events further comprising at least one event recorded in a position outside the hub area.

In one embodiment of the present invention, defining at least two categories of individuals, each category corresponding to a respective purpose for which the individuals reach or leave the transport hub comprises defining a departing category as a category of individuals that reach the transport hub for taking an outgoing transportation means. Preferably, defining at least one category of events associated with each category comprises defining a departing category pattern, associated with the departing category, comprising a first events set comprising one or more consecutive events recorded outside the hub area, and a second events set comprising a consecutive event recorded within the hub area, the second events set following the first event set.

In one embodiment of the present invention, the departing category pattern further comprises a third events set of one or more consecutive events recorded in the hub area, the third events set following the second events set. Preferably, a first time interval between a last event of the second events set and any event of the third events set is equal to, or lower than, a first predetermined permanence time period, and possibly a second time interval between consecutive events of the third events set is equal to, or lower than, a predetermined first threshold time period.

In one embodiment of the present invention, defining at least two categories of individuals, each category corresponding to a respective purpose for which the individuals reach or leave the transport hub comprises defining an arriving category as a category of individuals that reach the transport hub by exploiting a transportation means. Preferably, defining at least one category of events associated with each category comprises defining an arriving category pattern, associated with the arriving category, comprising a first events set comprising a single event recorded within the hub area, and a second events set comprising one or more consecutive events recorded outside the hub area, the second events set following the first events set.

In one embodiment of the present invention, the arriving category pattern further comprises a third events set comprising one or more consecutive events detected within the hub area, the third events set being comprised between the first events set and the second events set. Preferably, a third time interval between the first event of the third events set and any event of the first events set is equal to, or lower than, the predetermined first permanence time period.

In one embodiment of the present invention, defining at least two categories of individuals, each category corresponding to a respective purpose for which the individuals reach or leave the transport hub comprises defining a departing commuters category as a category of individuals that commute by exploiting the transportation means for leaving and returning to the hub area. Preferably, defining at least one category of events associated with each category comprises defining a departing commuters category pattern, associated with the departing commuters category, comprising first events set and second events set according to departing category pattern, and a third events set comprising a single event recorded within the hub area, the third events set following the second events set. Even more preferably, a fourth time interval between the event of the third events set and a last event of the second events set is greater than the predetermined first threshold time period.

In one embodiment of the present invention, the departing commuters category pattern further comprises a fourth events set comprising one or more consecutive events recorded within the hub area, the fourth events set following the third events set, and a fifth events set comprising one or more consecutive events recorded outside the hub area, the fifth events set following the fourth events set. Preferably, a fifth time interval between the event of the third events set and any event of the fourth events set is equal to, or lower than, the predetermined first permanence time period.

In one embodiment of the present invention, defining at least two categories of individuals, each category corresponding to a respective purpose for which the individuals reach or leave the transport hub comprises defining an arriving commuters category as a category of individuals that commute by exploiting the transportation means for reaching and leaving the hub area. Preferably, defining at least one category of events associated with each category comprises defining an arriving commuters category pattern, associated with the arriving commuters category, comprising first events set and second events set according to arriving category pattern, and a third events set comprising a single event recorded within the hub area, the third events set following the second events set. Even more preferably, a sixth time interval between the event of the third events set and a last event of the second events set is greater than a predetermined second threshold time period.

In one embodiment of the present invention, the arriving commuters category pattern further comprises a fourth events set comprising one or more consecutive events recorded within the hub area, the fourth events set following the third events set. Preferably, a seventh time interval between the event of the third events set and any event of the fourth events set is equal to, or lower than, the predetermined first permanence time period.

In one embodiment of the present invention, defining at least two categories of individuals, each category corresponding to a respective purpose for which the individuals reach or leave the transport hub comprises defining a non-traveler category as a category of individuals that reach the hub area but do not exploit the transportation means. Preferably, defining at least one category of events associated with each category comprises defining a non-traveler category pattern, associated with the non-traveler category, comprising first events set and second events set according to departing category pattern, and a third events set comprising one or more events recorded outside the hub area, the third events set following the second events set. Alternatively, defining at least one category of events associated with each category comprises defining a non-traveler category pattern, associated with the non-traveler category, comprising first events set and second events set according to arriving category pattern, and a third events set comprising a single event recorded within the hub area, the third events set following the second events set. Preferably, wherein an eighth time interval between the event of the third events set and a last event of the second events set is equal to, or lower than, the predetermined second threshold time period. Alternatively, defining at least one category of events associated with each category comprises defining a non-traveler category pattern, associated with the non-traveler category, comprising first events set, second events set and third events set according to arriving commuters category pattern, and a fourth events set comprising one or more events recorded outside the hub area, the fourth events set following the third events set.

In one embodiment of the present invention, defining at least two categories of individuals, each category corresponding to a respective purpose for which the individuals reach or leave the transport hub comprises defining a personnel category as a category of individuals working at the transport hub. Preferably, defining at least one category of events associated with each category comprises defining a personnel category pattern, associated with the personnel category, comprising first events set and second events set according to departing category pattern, and a third events set comprising an event recorded within the hub area, the third events set following the second events set. Even more preferably, a ninth time interval between the event of the third events set and a last event of the second events set is greater than the predetermined permanence time period. Alternatively, defining at least one category of events associated with each category comprises defining a personnel category pattern, associated with the personnel category, comprising a first events set comprising one or more event recorded within the hub area. Preferably, a tenth time interval between events of the third events set is greater than the predetermined permanence time period. Alternatively, defining at least one category of events associated with each category comprises defining a personnel category pattern, associated with the personnel category, comprising first events set, second events set and third events set according to arriving commuters category pattern, and a fourth events set comprising one or more events recorded within the hub area, the fourth events set following the fourth events set. Preferably, an eleventh time interval between the events of the fourth events set and a last event of the third events set is greater than the predetermined permanence time period.

In one embodiment of the present invention, acquiring event records associated with User Equipment from the mobile telecommunication network further comprises defining at least one further predetermined observation time, and acquiring event records associated with User Equipment having a time information referred to a time instant comprised in the at least one further predetermined observation time period. Preferably, searching the event records associated with each User Equipment of a pool of User Equipment for identifying sequences of events of interaction matching a category pattern comprises searching event records associated with User Equipment having a time information referred to a time instant comprised in the at least one further predetermined observation time period for identifying a respective at least one further sequence of events of interaction matching at least one further category pattern, and upon finding a match between the at least one further sequence of events and a category pattern, identifying the individual user of the User Equipment as belonging to a predetermined sub-category based on the category pattern and on the at least one further category pattern found.

In one embodiment of the present invention, further comprising defining a selected portion of the geographic area other than the hub area as a point of interest. Preferably, acquiring event records associated with User Equipment from the mobile telecommunication network comprises acquiring event records associated with User Equipment whether at least one event record thereof provides a position information associated with a position within the point of interest.

Another aspect of the present invention proposes a system coupled with a mobile telecommunication network for counting of individuals reaching or leaving a transport hub. The system comprises a computation engine adapted to process data retrieved from the mobile telecommunication network; a repository adapted to store data regarding interactions between the User Equipment and the mobile telephony network, computation results generated by the computation engine and, possibly, any processing data generated by and/or provided to the system; an administrator interface operable for modifying parameters and/or algorithms used by the computation engine and/or accessing data stored in the repository, and a memory element storing a software program product configured for implementing the method of above through the system.

BRIEF DESCRIPTION OF THE DRAWINGS

These and other features and advantages of the solution according to the present invention will be better understood by reading the following detailed description of an embodiment thereof, provided merely by way of non-limitative example, to be read in conjunction with the attached drawings, wherein.

DETAILED DESCRIPTION OF THE INVENTION

Figure 1:
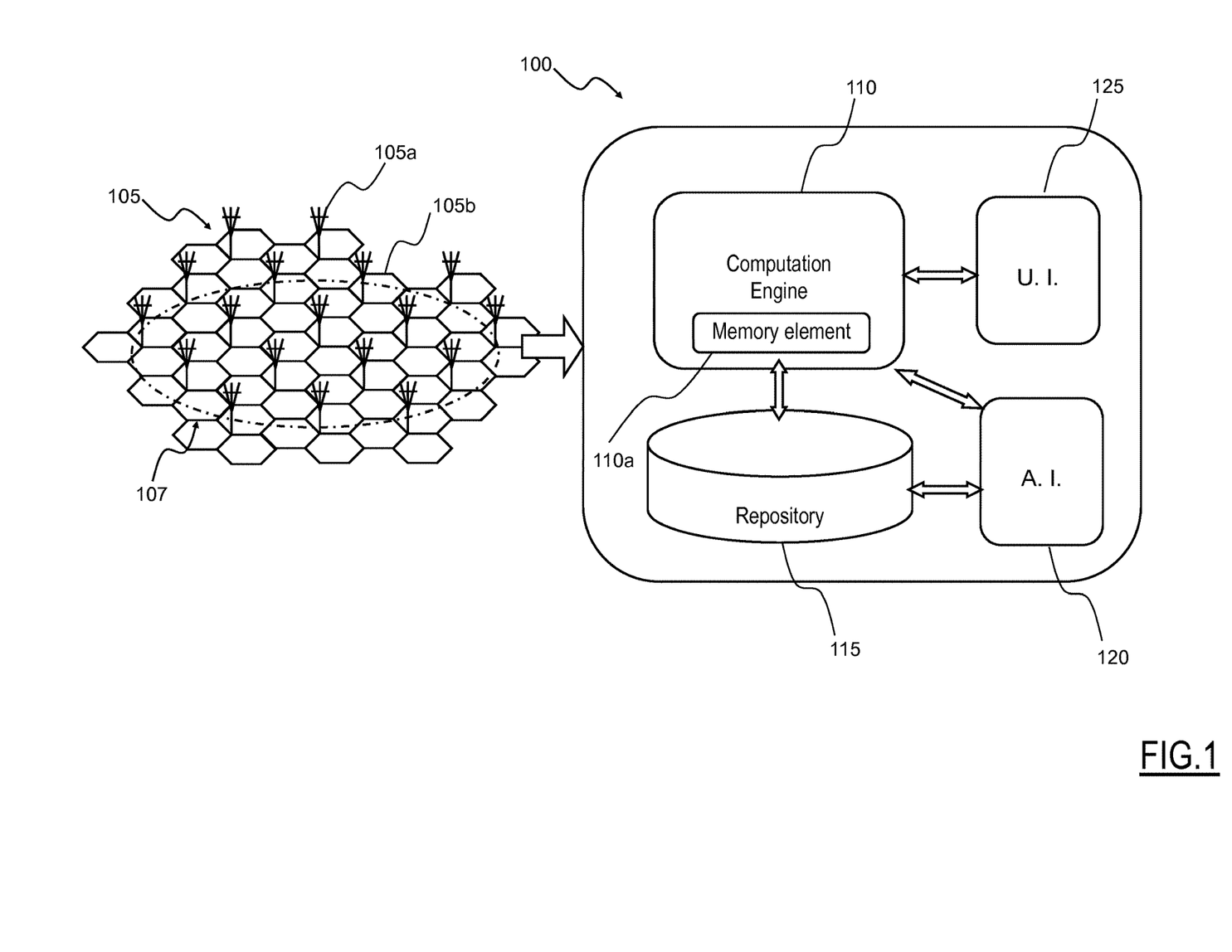
FIG. 1 is a schematic representation of a system for counting and classifying people within a transport hub according to an embodiment of the invention.

With reference to the drawings, FIG. 1 is a schematic representation of a system for counting and classifying people reaching or leaving a transport hub, simply denoted as system 100 hereinafter, according to an exemplary embodiment of the present invention.

Figure 2:
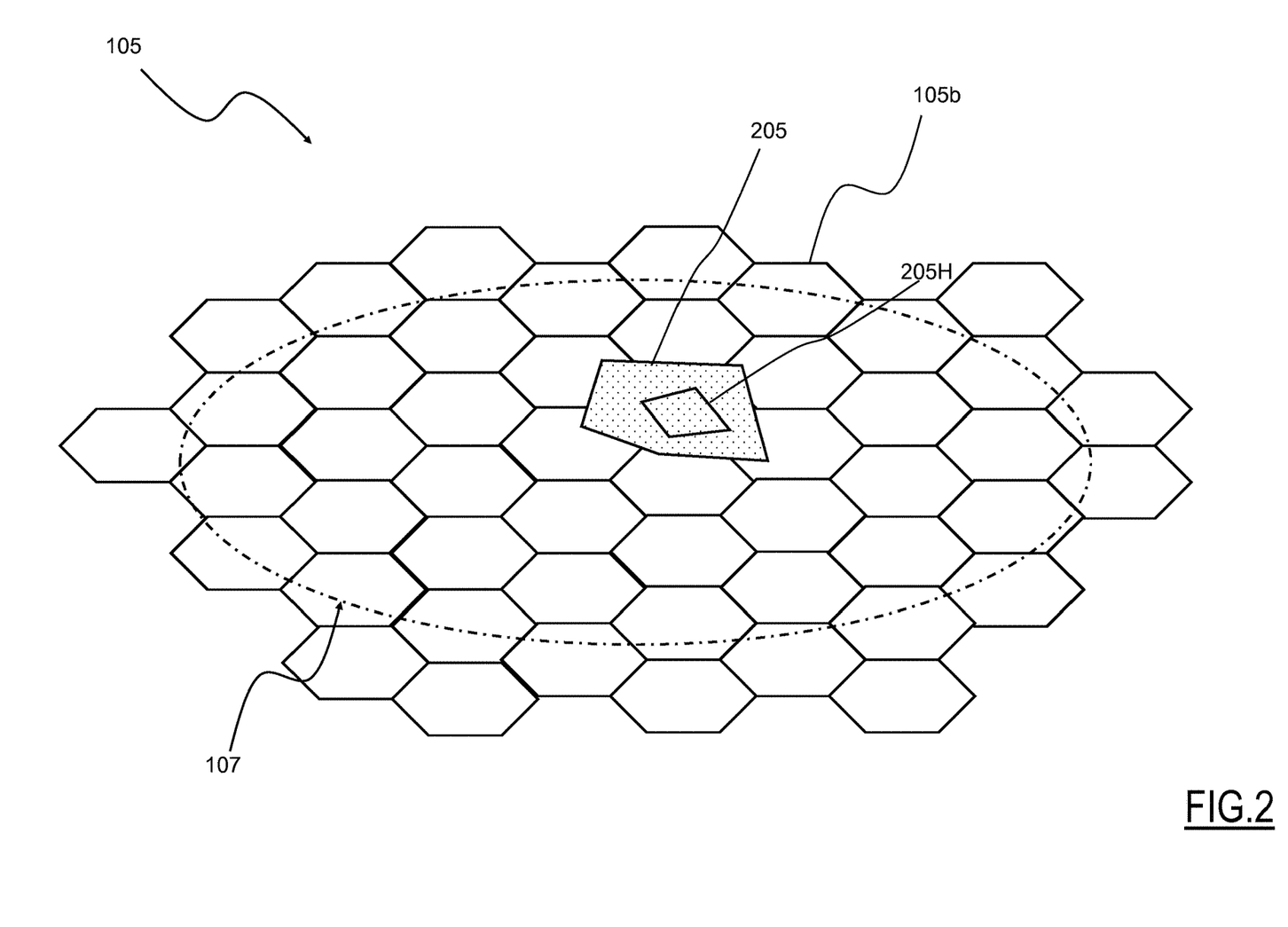
FIG. 2 is a schematic representation of a surveyed area within which the transport hub area is located.

The system 100 allows performing an estimation of a number and of categories (e.g., incoming traveler, departing traveler, non-travelling partners, drivers, personnel, etc.) of persons that interact with a transport hub (e.g., an airport, a railway station, a bus station, an underground station, etc., or a combination/superposition thereof; schematically shown in FIG. 2 where is indicated by reference 205H) during a predetermined observation time period $T_{obs}$ (e.g., persons that reach, leave and/or spend time at the transport hub within the observation period).

It should be noted that the term 'observation time period' as used herein may comprise a predetermined time interval possibly comprising one or more time subintervals. For example, an observation time period $T_{obs}$ may comprise a continuous time interval, for example, encompassing one or more selected days (e.g., expressed as a start date and time and an end date and time, such as for example an observation time period $T_{obs}$ ranging from the first of September at 6:00 am to the second of September at 5:00 pm). Alternatively, the observation time period $T_{obs}$ may comprise a time interval comprising one or more subintervals that are periodically repeated, e.g., on a daily/weekly/monthly basis. For example, a non-continuous time interval may extend over a week, and comprise a subinterval for each day of the week (e.g., each subinterval ranges from the 06:00 am to the 06:00 pm of a respective day of the week that builds up the time interval).

The system 100 is coupled with a mobile communication network 105, such as a (2G, 3G, 4G or higher generation) mobile telephony network, and is configured for receiving from the mobile communication network 105 positioning data of each User Equipment (UE in the following; e.g. a mobile phone, a smartphone, a tablet with 2G-3G-4G connectivity, etc.) of individuals located in a surveyed geographic area 107 (indicated in dash-and-dot line in FIG. 1), comprising but not limited to the transport hub, schematized in FIG. 1 as the area within the dash-and-dot line.

It should be noted that the terms 'surveyed geographic area' and 'surveyed area' 107 as used herein may comprise a 'continuous' geographic area, e.g. a county, a municipality, a city, one or more city blocks, etc. Alternatively, the surveyed area 107 may comprise one or more 'non-contiguous' geographic areas. For example, a surveyed area 107 may comprise two or more distant geographic regions, preferably each comprising a respective transport hub. Even more preferably, such transport hubs are connected by line routes of transportation vehicles, i.e. transportation means providing a transportation service along one or more line routes stopping at the transport hub, to the transport hub being analyzed.

The mobile communication network 105 comprises a plurality of (two or more) communication stations 105a (e.g., radio base stations of the mobile telephony network) geographically distributed in the surveyed area 107. Each communication station 105a is adapted to manage communications of UE (not shown, such as for example mobile phones, smartphones, tablets, etc.) in one or more served areas or cells 105b (in the example at issue, three cells are served by each communication station 105a).

Generally, each communication station 105a of the mobile communication network 105 is adapted to interact with any UE located within one of the cells 105b served by such communication station 105a (e.g., interactions at power on/off of the UE, at location area update, at incoming/outgoing calls, at sending/receiving SMS and/or MMS, at Internet access, etc.). Such interactions between UE and mobile communication network 105 will be generally denoted as events $e_v$, (v=1, ..., V; V>0) in the following.

The surveyed geographic area 107 may be regarded as subdivided in a plurality of sectors, each corresponding to a respective cell 105b of the (part of the) mobile telephony network 105 superimposed on the surveyed area 107.

The system 100 comprises a computation engine 110 configured for processing data retrieved from the mobile communication network 105, and a repository 115 (such as a database, a file system, etc.) for storing: data regarding interactions between the UE and the mobile communication network 105, computation results generated by the computation engine 110 and, possibly, any processing data generated by and/or provided to the system 100 (generally in a binary format). The system 100 is provided with an administrator interface 120 (e.g., a computer) configured and operable for modifying parameters and/or algorithms used by the computation engine 110 and/or accessing data stored in the repository 115.

Preferably, the system 100 comprises one or more user interfaces 125 (e.g., a user terminal, a software running on a remote terminal connected to the system 100) adapted to receive inputs from, and to provide output to a user of the system 100. The term "user of the system" as used in the present disclosure may refer to one or more human beings and/or to external computing systems (such as a computer network, not shown) of a third party being subscriber of the services provided by the system 100 and enabled to access the system 100—e.g., under subscription of a contract with a service provider owner of the system 100, and possibly with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115, connected to other machines implementing administrator 120 and user interface 125) or of virtual type (e.g., by implementing one or more virtual machines in a computer network).

Generally, the system 100 comprises, but is not limited to hardware, firmware, software or a combination thereof.

For example, the system 100 comprises, but is not limited to: one or more processes running on one or more processors; one or more data processors; one or more software objects; one or more executable computer programs; one or more threads of execution of computer programs, and/or one or more computing devices (e.g., the UE, the communication stations 105a as well as other elements of the mobile communication network 105, and/or one or more general purpose or dedicated computers).

In other words, the computation engine 110, the repository 115, the administrator interface 120 and the user interface 125 may comprise one or more software applications being executed on a computing device and/or the computing device itself.

One or more among the computation engine 110, the repository 115, the administrator interface 120 and the user interface 125 may be implemented in one computing device and/or may be distributed between two or more computing devices.

The computation engine 110, the repository 115, the administrator interface 120 and the user interface 125 may comprise and/or interact with computer readable media capable of storing data (according to one or more data structures, e.g. in a binary format).

The computation engine 110, the repository 115, the administrator interface 120 and the user interface 125 may communicate by exploiting local and/or remote processes, preferably by means of electrical, electromagnetic and/or optical signals, preferably, providing one or more data packets, such as data packets from one entity interacting with another entity in a local system, in a distributed system, and/or across a radio network and/or a wired network.

The system 100 is adapted to retrieve (and/or receive) from the mobile communication network 105 an event record $er_v$ for each event $e_v$ occurred between a UE and the mobile communication network 105 (through one of its communication stations 105a) within the surveyed geographic area 107. Event records $er_v$ are recorded by the mobile communication network 105 upon the occurrence of corresponding events $e_v$. Preferably, each event record $er_v$ comprises—in a non-limitative manner—an identifier id of the UE that is involved in the corresponding event $e_v$ (e.g., the UE identifier may be selected as one or more among the International Mobile Equipment Identity—IMEI, the International Mobile Subscriber Identity—IMSI and the Mobile Subscriber ISDN Number—MSISDN code), time data (or information, also denoted as timestamps) is indicating the time instant at which the corresponding event $e_v$ has occurred, and UE geographical position data (or information), e.g. spatial indications (e.g., geographical coordinates) based on the cell 105b in which the UE is located at the time of occurrence of the corresponding event $e_v$.

In one embodiment of the present invention, the UE identifier of the UE involved in the event record $er_v$ may be provided as encrypted information in order to ensure the privacy of the UE owner/user. Anyway, if the need arises, the encrypted information (i.e., the identity of the owner/user of the UE corresponding to the UE identifier) may be decrypted by implementing a suitable decryption algorithm, such as for example the algorithm SHA256 described in "Secure Hash Standard (SHS)", National Institute of Standards and Technology FIPS—180-4, Mar. 6, 2052.

The system 100 may retrieve (and/or receive) the event records $er_v$ related to a generic UE from the mobile communication network 105 by acquiring records of data generated and used in the mobile communication network 105. For example, in case the mobile communication network 105 is a GSM network, Charging Data Records (CDR), also known as call data records, and/or Visitor Location Records (VLR) may be retrieved from the mobile communication network 105 and reused as event records $er_v$. The CDR is a data record (usually exploited for billing purposes by a mobile telephony service provider operating through the mobile communication network 105) that contains attributes specific to a single instance of a phone call or other communication transaction performed between a UE and the mobile communication network 105. The VLR are databases listing UE that have roamed into the jurisdiction of a Mobile Switching Center (MSC, not shown) of the mobile communication network 105, which is a management element of the mobile communication network 105 managing events over a plurality of communication stations 105a. Each communication station 105a in the mobile communication network 105 is usually associated with a respective VLR.

Conversely, if the mobile communication network 105 is a LTE network, records of data associated with the event records $er_v$ of a generic UE are generated by a Mobility Management Entity, or MME, comprised in the mobile communication network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records $er_v$ comprising a univocal identifier of individuals (such as the UE identifier mentioned above), position information of such individuals, and a time indication of an instant during which such event has occurred.

In operation, event records cry may be continuously retrieved by the system 100 from the mobile communication network 105. Alternatively, event records $er_v$ may be collected by the system 100 periodically, e.g. during the observation time period $T_{obs}$ of above. For example, event records $er_v$ may be transferred from the mobile communication network 105 to the system 100 as they are generated, in a sort of "push" modality, or event records $er_v$ may be collected daily in the mobile communication network 105 and then packed and transferred to the system 100 periodically or upon request by the system 100.

The event records $er_v$ retrieved from the mobile communication network 105 are stored in the repository 115, where they are made available to the computation engine 110 for processing. Preferably, event records $er_v$ generated by a same UE are grouped together, even more preferably they are grouped together in the repository 115, i.e. event records $er_v$ are grouped together if they comprise a common UE identifier and are denoted to as event records group $erg_n$ (e.g., n=0, ..., N, N≥0) hereinafter.

Preferably, the computation engine 110 implements a procedure for counting and classifying people (described in the following). For example, the computation engine 110 implements a software program product designed for counting and classifying people that may be stored in a memory element 110a of the system 100 (comprised in the computation engine 110 in the example of FIG. 1), even though the software program product could be stored in the repository 115 as well (or in any other memory element provided in the system 100).

Even more preferably, the event records $er_v$ are processed according to (as discussed in detail below) instructions provided by the system administrator (through the administrator interface 120), for example stored in the repository 115, and, possibly, according to instructions provided by a user (through the user interface 125).

Finally, the computation engine 110 provides the results of the processing performed on the event records $er_v$ to the user through the user interface 125, and optionally stores such processing results in the repository 115.

It should be noted that the system 100 might be adapted to retrieve (or receive) data about individuals not exclusively from a mobile telephony network 105. Alternatively or in addition, the system may be configured to retrieve (or receive) data about individuals from one or more wireless computer networks, such as WLANs, operating in the surveyed area 107, provided that the UE of the individuals are capable to connect to such wireless computer networks.

Further, it should be noted that the system 100 may be configured for retrieving event records $er_v$ associated with a pool of UEs. Preferably, such pool of UEs may comprise a portion of the UEs that are associated with an event $e_v$ of interaction with the mobile telecommunication network 105 to all the UEs associated with an event $e_v$ of interaction with the mobile telecommunication network 105 (e.g., during the observation time period $T_{obs}$) according to instructions provided by the system administrator (through the administrator interface 120) and, possibly, according to instructions provided by a user (through the user interface 125)

FIG. 2 is a schematic representation of a surveyed area 107 within which an area of a transport hub, or hub area 205, is comprised. The hub area 205, which is schematically represented as a polygon superimposed to the surveyed area 107, substantially comprises the transport hub 205H, i.e., all the facilities and infrastructures comprised in, and/or associated with, the transport hub 205H. For example, in case the considered transport hub 205H comprises an airport, a terminal, one or more hangars, a control tower, one or more ramps, runways, aircrafts stands, maintenance and firefight buildings, parking lots etc.

It should be apparent that, in other embodiments of the present invention, an 'aggregated' hub area may be defined as the aggregation of facilities comprised in, and/or associated with, two or more transport hubs. In other words, the aggregated hub area is a union of the hub areas associated with the two or more transport hubs considered. For example an aggregated hub area may be defined by the aggregation of the airports of a nation, or by the aggregation of bus stations, train stations, and underground stations comprised in a same city (e.g., in order to analyze data on a nationwide or citywide scale). Advantageously, the analysis of individuals reaching or leaving the aggregated hub areas still provides information also on individuals that reach or leave each one of the hub areas comprised in the aggregate hub area.

According to an embodiment of the invention, the system 100 allows counting persons that have been at the hub area 205 within the observation time period $T_{obs}$ (i.e., individuals whose UE have generated one or more events $e_v$ localized within the hub area 205 during the observation period and recorded as a corresponding event record $er_v$), and classifying each person, or individual, according to two or more categories of individuals.

As a non-limiting example, the following seven categories may be defined for individuals:

A category: departing individuals, i.e. people that leave (e.g., by taking an outgoing flight at an airport) the hub area 205 by taking an outgoing transportation means;

B category: arriving individuals, i.e. people that arrive (e.g., by taking an incoming flight at an airport) at the hub area 205 exploiting a transportation means;

C category: outgoing commuting individuals, i.e. people that leave the hub area 205 and then return back to the hub area 205, exploiting transportation means, within the observation time period $T_{obs}$;

D category: incoming commuting individuals, i.e. people that arrive at the hub area 205 and then leave the hub area 205, exploiting transportation means, within the observation time period $T_{obs}$;

E category: non-travelling individuals, i.e. people that reach/leave the hub area 205 without exploiting the transportation means (e.g., aircrafts) of the transport hub 205H (e.g. chauffeurs, taxi drivers, bus drivers, partners of the travelling individuals, etc.);

F category: individuals part of the personnel of the transport hub 205H, personnel individuals in the following, i.e. people that works at the hub area 205, and G category: other individuals, i.e. this category comprises all the people that are not identified as belonging to one of the preceding categories.

Advantageously, categories, such as categories A to G listed above, may be selected for the analysis according to requests from an enterprise managing the transport hub 205H or any other party that requires an analysis of people accessing the transport hub 205H.

In an embodiment of the invention, the administrator interface 120 and, preferably, the user interface 125 are configured for allowing an administrator or a user, respectively, to select, modify, delete and/or define categories of individuals to be identified by the process implemented by the system 100 (as described in the following).

According to the present invention, each category A to G is associated with one or more corresponding patterns of events, or events patterns $e_v$, i.e. sequences of events $e_v$ common to the individuals of a same category A to G.

Preferably, the events patterns comprise one or more (first) sets of mandatory events and, optionally, one or more (second) sets of optional events. The mandatory events are events that have to be found among the events $e_v$ associated with the UE of an individual for identifying the latter as belonging to a corresponding category. Conversely, optional events are events that may be found among the events $e_v$ associated with the UE of an individual belonging to a corresponding category.

Preferably, for each individual, a first event $e_v$ of an events pattern may correspond to the event $e_v$ associated with a first event record $er_v$ recorded during the considered observation time period $T_{obs}$.

Conversely, a last event $e_\nu$ of an events pattern may correspond to the event $e_\nu$ associated with a last event record $er_\nu$ recorded during the observation time period $T_{obs}$, or the last event $e_\nu$ of an events pattern may correspond to the event $e_\nu$ preceding the identification of the occurrence of a predetermined 'termination' condition.

For example, a termination condition may be defined as a 'power off' event associated with the UE (i.e., the UE is turned/switched off or put in airplane mode, such as for example before the takeoff phase of a flight), when a UE lose connection with the mobile telecommunication network 105 (e.g., when a ship is offshore), or when a 'termination sequence' is detected.

In an embodiment of the invention, a termination sequence may comprise two or more events recorded at, possibly predetermined, locations separated by a minimum distance one another. In other words, the termination sequence indicates that the UE is leaving the hub area on a land transportation means such as a train or a bus—e.g., the termination sequence comprises one or more events recorded in correspondence of cells 105b (known to be) positioned along routes travelled by transportation means, and recorded at time intervals compatible with an average speed of the transportation means.

In an embodiment of the present invention, an events pattern Ap is associated with A category, an events pattern Bp is associated with B category, an events pattern Cp is associated with C category, an events pattern Dp is associated with D category, events patterns $Ep_1$, $Ep_2$ and $Ep_3$ are associated with E category, events patterns $Fp_1$, $Fp_2$ and $Fp_3$ are associated with F category, and an events pattern Gp is associated with G category. It should be noted, that the events pattern Gp associated with the G category may remain undefined, since individuals may be considered belonging to the G category when any one of the patterns Ap to Fp is not identified while analizying the respective events records group $erg_n$.

The events patterns Ap to Fp according to an embodiment of the invention are described hereinbelow.

The events pattern Ap, i.e. pattern of events associated with departing individuals, comprises the following events sets.

Ap.a: (mandatory) one or more consecutive events $e_\nu$ detected (i.e., recorded as event record $er_\nu$) within the surveyed area 107, but outside the hub area 205;

Ap.b: (mandatory, and possibly comprising the last event $e_\nu$ recorded for the events pattern Ap if the events set Ap.c as described below is not present) a single event $e_\nu$ detected within the hub area 205 subsequent to the detection of event set Ap.a;

Ap.c: (optional, and comprising the last event $e_\nu$ recorded for the events pattern Ap, if present) one or more consecutive events $e_\nu$ detected within the hub area 205 subsequent to event set Ap.b. Particularly, the events $e_\nu$ of the events set Ap.c should possess the following features:

Ap.$c_1$: a (first) time interval $\Delta t_{a1}$ between the event $e_\nu$ of the events set Ap.b and any event $e_\nu$ of the events set Ap.c is equal to, or lower than, a permanence time period Tperm (described in the following), and Ap.$c_2$: a (second) time interval $\Delta t_{a2}$ between consecutive events $e_\nu$ of the events set Ap.c is equal to, or lower than, a (first) threshold time period Tv_out (described in the following).

Pattern Bp, i.e. pattern of events associated with arriving individuals, comprises the following events sets.

Bp.a: (mandatory) a single event $e_\nu$ detected within the hub area 205;

Bp.b: (optional) one or more consecutive events $e_\nu$ detected within the hub area 205. Particularly, the events $e_\nu$ of the event set Bp.b should possess the following feature:

Bp.$b_1$: a (third) time interval $\Delta t_{b1}$ between the event $e_\nu$ of the events set Bp.a and any event $e_\nu$ of the events set Bp.b is equal to, or lower than, the permanence time period Tperm, and Bp.c: (mandatory, and comprising the last event $e_\nu$ recorded for the events pattern Bp) one or more consecutive events $e_\nu$ detected within the surveyed area 107, but outside the hub area 205.

The event pattern Cp, i.e. pattern of events associated with departing commuting individuals, comprises the following events sets.

Cp.a: (mandatory) a sequence of events $e_\nu$ according to pattern Ap (e.g., at least comprising the mandatory events sets Ap.a and Ap.b);

Cp.b: (mandatory, and possibly comprising the last event $e_\nu$ recorded for the events pattern Cp) a single event $e_\nu$ detected within the hub area 205, preferably, possessing the following feature:

Cp.$b_1$: a (fourth) time interval $\Delta t_{c1}$ between the event $e_\nu$ of the event set Cp.b and a last event $e_\nu$ of the events set Cp.a is greater than the (first) threshold time period Tv_out;

Cp.c: (optional, and possibly comprising the last event $e_\nu$ recorded for the events pattern Cp, if present) one or more consecutive events $e_\nu$ detected within the hub area 205. Preferably, the events $e_\nu$ of the events set Cp.c possess the following feature:

Cp.$c_1$: a (fifth) time interval $\Delta t_{c2}$ between the event $e_\nu$ of the events set Cp.b and any event $e_\nu$ of the events set Cp.c is equal to, or lower than, the (first) permanence time period Tperm, and Cp.d: (optional, and comprising the last event $e_\nu$ recorded for the events pattern Cp, if present) one or more consecutive events $e_\nu$ detected within the surveyed area 107, but outside the hub area 205.

The event pattern Dp, i.e. pattern of events associated with arriving commuting individuals, comprises the following events sets.

Dp.a: (mandatory) a sequence of events $e_\nu$ according to pattern Bp (e.g., at least comprising the mandatory events sets Bp.a and Bp.c);

Dp.b: (mandatory, and possibly comprising the last event $e_\nu$ recorded for the events pattern Dp if the events set Dp.c as described below is not present) a single event $e_\nu$ detected within the hub area 205, preferably, possessing the following feature:

Dp.$b_1$: a (sixth) time interval $\Delta t_{d1}$ between the event $e_\nu$ of the event set Dp.b and a last event $e_\nu$ of the events set Dp.a is greater than a (second) threshold time period Tv_in (described in the following), and Dp.c: (optional, and comprising the last event $e_\nu$ recorded for the events pattern Dp, if present) one or more consecutive events $e_\nu$ detected within the hub area 205. Preferably, the events $e_\nu$ of the events set Dp.c possess the following feature:

Dp.$c_1$: a (seventh) time interval $\Delta t_{d2}$ between the event $e_\nu$ of the events set Dp.b and any event $e_\nu$ of the events set Dp.c is equal to, or lower than, the permanence time period Tperm.

The events patterns $Ep_1$, $Ep_2$ and $Ep_3$, i.e. patterns of events associated with non-travelling individuals, comprise the following three alternative events sets combinations.

A first events pattern $Ep_1$ comprises the following events sets:
- $Ep_1.a$: (mandatory) a sequence of events $e_v$ according to pattern Ap (e.g., at least comprising the mandatory events sets Ap.a and Ap.b), and
- $Ep_1.b$: (mandatory, and comprising the last event $e_v$ recorded for the events pattern Ep) one or more consecutive events $e_v$ detected within the surveyed area 107, but outside the hub area 205.

A second events pattern $Ep_2$ comprises the following events sets:
- $Ep_2.a$: (mandatory) a sequence of events $e_v$ according to pattern Bp (e.g., at least comprising the mandatory events sets Bp.a and Bp.c), and
- $Ep_2.b$: (mandatory, and comprising the last event $e_v$ recorded for the events pattern Ep) a single event $e_v$ detected within the hub area 205, preferably, possessing the following feature:
  - $Ep_2.b_1$: a (eigth) time interval $\Delta t_{e1}$ between the event $e_v$ of the event set $Ep_2.b$ and a last event $e_v$ detected in the hub area 205 of the events set $Ep_2.a$ (i.e., event $e_v$ of events set Bp.a or Bp.c if present) is equal to, or lower than, the (second) threshold time period Tv_in.

A third events pattern $Ep_3$ comprises the following events sets:
- $Ep_3.a$: (mandatory) a sequence of events $e_v$ according to pattern Dp (e.g., at least comprising the mandatory events sets Dp.a and Dp.b), and
- $Ep_3.b$: (mandatory, and comprising the last event $e_v$ recorded for the events pattern Ep) one or more consecutive events $e_v$ detected within the surveyed area 107, but outside the hub area 205.

The events patterns $Fp_1$, $Fp_2$ and $Fp_3$, i.e. patterns of events associated with transport hub 205H personnel individuals comprise the following three alternative events sets combinations.

A first events pattern $Fp_1$ comprises the following events sets:
- $Fp_1.a$: (mandatory) a sequence of events $e_v$ according to pattern Ap (e.g., at least comprising the mandatory events sets Ap.a and Ap.b);
- $Fp_1.b$: (mandatory, and comprising the last event $e_v$ recorded for the events pattern Fp) a single event $e_v$ detected within the hub area 205, preferably, possessing the following feature:
  - $Fp_1.b_1$: a (ninth) time interval $\Delta t_{f1}$ between the event $e_v$ of the events set $Fp_1.b$ and a first event $e_v$ of the events set $Fp_1.a$ is greater than the permanence time period Tperm.

A second events pattern $Fp_2$ comprises the following events set:
- $Fp_2.a$: (mandatory, and comprising the last event $e_v$ recorded for the events pattern Fp) one or more consecutive events $e_v$ detected within the hub area 205. Preferably, the events $e_v$ of the events set $Fp_2.a$ possess the following feature:
  - $Fp_2.a_1$: a (tenth) time interval $\Delta t_{f2}$ between the first event $e_v$ of the events set $Fp_2.a$ and any one of the other events $e_v$ of the events set $Fp_2.a$ is greater than the permanence time period Tperm.

A third events pattern $Fp_3$ comprises the following events set:
- $Fp_3.a$: (mandatory) a sequence of events $e_v$ according to pattern Dp (e.g., at least comprising the mandatory events sets Dp.a and Dp.b), and
- $Fp_3.b$: (mandatory, and comprising the last event $e_v$ recorded for the events pattern Fp) one or more events $e_v$ detected within the hub area 205, preferably, possessing the following feature:
  - $Fp_3.b_1$: a (eleventh) time interval $\Delta t_{f3}$ between the event $e_v$ of the event set Dp.b and a first event $e_v$ of the events set $Fp_3.b$ is greater than the permanence time period Tperm.

The events pattern Gp, i.e. pattern of events associated with other individuals, comprises any sequence of events $e_v$ different from any one of the events sequences described above with respect to patterns Ap to Fp (in particular for the events sets classified as mandatory).

In summary, according to a preferred embodiment of the invention, a generic sequence of events $e_v$ recorded during the observation time period $T_{obs}$ is identified to correspond to one of the events pattern Ap-$Fp_3$ described above whether the sequence of events $e_v$ comprises all the mandatory events sets associated with such one events pattern Ap-$Fp_3$, and whether the last recorded event $e_v$ of the generic sequence of events $e_v$ recorded within the observation time period $T_{obs}$ is comprised in a last mandatory event set of the one events pattern Ap-$Fp_3$, or the last recorded event $e_v$ is comprised in a last optional event set of the one events pattern Ap-$Fp_3$ (i.e., the last recorded event $e_v$ of the generic sequence of events $e_v$ corresponds to the last event $e_v$ of the one events pattern Ap-$Fp_3$).

For example, a sequence of events $e_v$ recorded during the observation time period $T_{obs}$ corresponds to events pattern Ap whether both mandatory events sets Ap.a and Ap.b are identifiable in the sequence of events $e_v$, and the last event $e_v$ of the sequence of events $e_v$ is comprised in the mandatory events set Ap.b (i.e., the last event $e_v$ of the sequence of events $e_v$ is the last event $e_v$ associated with the mandatory events set Ap.b) or the last event $e_v$ of the sequence of events $e_v$ is comprised in the optional events set Ap.c (i.e., the last event $e_v$ of the sequence of events $e_v$ is the last event $e_v$ associated with the optional events set Ap.c) if the latter is identified in the sequence of events $e_v$.

A sequence of events $e_v$ recorded during the observation time period $T_{obs}$ corresponds to the events pattern Bp whether mandatory events sets Bp.a to Bp.c are identifiable in the sequence of events $e_v$, and the last event $e_v$ of the sequence of events $e_v$ is comprised in the mandatory events set Bp.c.

A sequence of events $e_v$ recorded during the observation time period $T_{obs}$ corresponds to events pattern Cp whether both mandatory events sets Cp.a and Cp.b are identifiable in the sequence of events $e_v$, and the last event $e_v$ of the sequence of events $e_v$ is comprised in the mandatory events set Cp.b, or in the optional events set Cp.c if identified in the sequence of events $e_v$ while the optional events set Cp.d is not identified, or in the optional events set Cp.d if identified in the sequence of events $e_v$.

A sequence of events $e_v$ recorded during the observation time period $T_{obs}$ corresponds to events pattern Dp whether both mandatory events sets Dp.a and Dp.b are identifiable in the sequence of events $e_v$, and the last event $e_v$ of the sequence of events $e_v$ is comprised in the mandatory events set Dp.b or in the optional events set Dp.c if the latter is identified in the sequence of events $e_v$.

A sequence of events $e_v$ recorded during the observation time period $T_{obs}$ corresponds to events pattern $Ep_1$, $Ep_2$ or $Ep_3$, respectively, whether mandatory events sets $Ep_1.a$ and $Ep_1.b$, $Ep_2.a$ and $Ep_2.b$ or $Ep_3.a$ and $Ep_3.b$, respectively, are identifiable in the sequence of events $e_v$, and the last event $e_v$ of the sequence of events $e_v$ is comprised in the mandatory events set $Ep_1.b$, $Ep_2.b$ or $Ep_3.b$, respectively.

A sequence of events $e_v$ recorded during the observation time period $T_{obs}$ corresponds to events pattern $Fp_1$, $Fp_2$ or $Fp_3$, respectively, whether mandatory events sets $Fp_1.a$ and $Fp_1.b$, $Fp_2.a$ or $Fp_3.a$ and $Fp_3.b$, respectively, are identifiable in the sequence of events $e_v$, and the last event $e_v$ of the sequence of events $e_v$ is comprised in the mandatory events set $Fp_1.b$, $Fp_2.a$ or $Fp_3.b$, respectively.

It should be noted that nothing prevents the administrator and/or the user of the system from modifying the criteria for identifying events patterns Ap to Gp from what just described in order to satisfy local and specific requirements without departing from the scope of the present invention.

In an alternative embodiment of the invention, a generic sequence of events $e_v$ may be considered to correspond to more than one events pattern Ap to Gp, provided that at least the mandatory events sets comprised in the one or more events pattern Ap to Gp are identifiable in the sequence of events $e_v$.

For example, in case the events sets Ap.a, Ap.b and Cp.b are identified in the generic sequence of events $e_v$, the latter may be associated to the events pattern Cp (since events sets Ap.a, Ap.b are comprised in the mandatory events set Cp.a) and may also be associated to the events pattern Ap regardless the fact that the events set Cp.b comprises the last event $e_v$ of the sequence of events $e_v$.

Preferably, the permanence time period Tperm corresponds to a time period spent at the transport hub 205H above which an individual cannot be considered a traveler (outgoing, incoming and/or commuting individuals) or a partner of a traveler. Therefore, individuals spending a time period at the transport hub 205H greater than the permanence time period Tperm are considered personnel of the transport hub 205H. In an embodiment of the invention, the permanence time period Tperm is set to a respective default value equal to six hours (i.e., Tperm=6 hr).

Preferably, the (first) threshold time period Tv_out corresponds to a minimum duration of an outgoing round trip, starting and ending within the hub area 205 within the observation time period $T_{obs}$ (i.e., the trip of an outgoing commuting individual). In an embodiment of the invention, the permanence time period Tv_out is set to a default value equal to 7 hours (i.e., Tv_out=7 hr).

Preferably, the (second) threshold time period Tv_in corresponds to a minimum time period spent by an individual within the surveyed area 107, starting and ending within the hub area 205 during the observation time period $T_{obs}$ (i.e., the trip of an arriving commuting individual). In an embodiment of the invention, the permanence time period Tv_in is set to a default value equal to 4 hours (i.e., Tv_in=4 hr).

In one embodiment of the invention, the default values for the time periods Tperm, Tv_out and Tv_in are selected based on an analysis of the behavior of a sample of users.

Preferably such default values may be modified according to (as discussed in detail below) instructions (which are for example stored in the repository 115) provided by the system administrator (through the administrator interface 120) and/or, possibly, according to instructions provided by a user (through the user interface 125).

Figure 3:
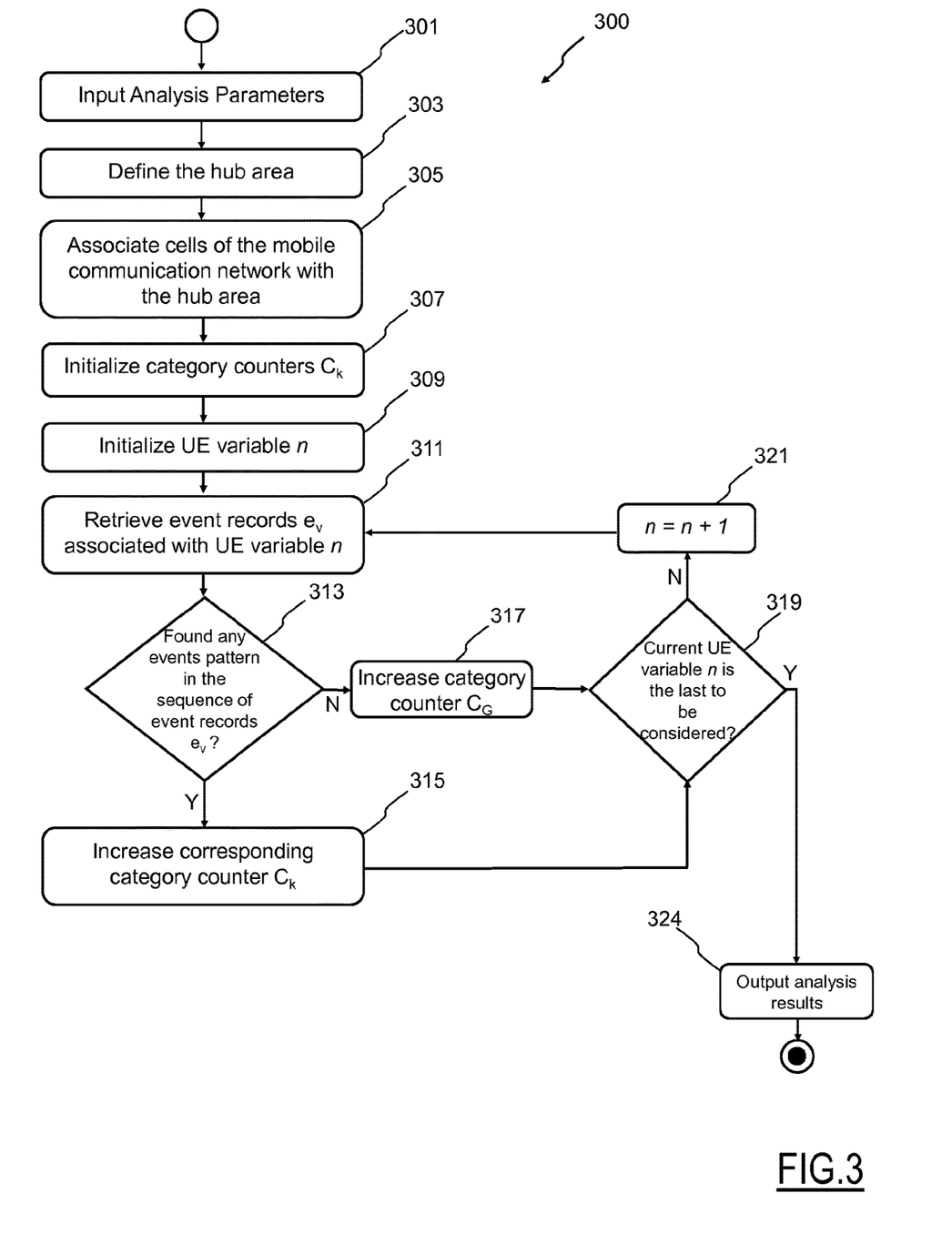
FIG. 3 is a schematic flowchart of a procedure for counting and classifying people within the transport hub according to an embodiment of the invention.

FIG. 3 is a schematic flowchart of a procedure 300 for counting and classifying people within the transport hub 205H according to an embodiment of the invention.

Initially (block 301) the system 100 administrator, through the administrator interface 120, and/or the system 100 user, through the user interface 125, inputs one or more parameters for defining the analysis to be performed.

For example, the parameters comprise (in a non-limiting manner) the observation time period $T_{obs}$ during which the movements of individuals are considered, the surveyed area 107 (comprising the transport hub 205H) to be considered in the analysis.

According to an embodiment of the invention, the surveyed area 107 may be defined by a digital file such as a shapefile. A shapefile is a geospatial vector data format for Geographic Information System (GIS) software. The shapefile format can spatially describe vector features such as for example: points, lines, and polygons, representing, for example, buildings, infrastructures, relevant natural conformations such as rivers, lakes, mountains etc. In addition, each item described in the shapefile may comprise additional information in the form of attributes, such as name, height, size, temperatures, etc., of the item.

Next (block 303), the administrator, through the administrator interface 120, and/or the user, through the user interface 125, input the features of the transport hub 205H considered in the analysis. Particularly, the polygon corresponding to the hub area 205 is defined.

In an embodiment of the invention, coordinates of the vertexes of the hub area 205 may be inputted to the system 100, for example another shapefile may be provided to the system 100 in order to define the hub area 205. It should be noted that nothing prevents from defining the hub area 205 as a single point in the surveyed area 107, in this case only the coordinates of such a point are inputted to the system 100.

In a further embodiment of the invention, the system 100 comprises preconfigured values for the hub area 205; preferably, the preconfigured values for the hub area 205 are stored in the repository 115 of the system 100.

For example, in order to define the hub area 205, the repository may store the coordinates of the vertexes of the polygon that corresponds to the official borders/boundaries of the considered transport hub 205H. In alternative or in addition, the repository may store preconfigured values that comprise the coordinate of a geographic point associated with considered transport hubs 205H, preferably, the coordinates substantially correspond to the coordinates provided by reliable mapping software applications/services (e.g., Google Maps, Google Earth, OpenStreetMap, etc.) for the considered transport hubs 205H.

Advantageously, the system 100 may store (in the repository 115) a list or a database of preconfigured values describing the hub area 205 and/or the respective surveyed area 107 as well as one or more further transport hubs and, possibly, respective surveyed areas of one or more countries of interest, continents, up to covering the whole Earth.

Accordingly, the administrator, through the administrator interface 120, and/or the user, through the user interface 125, may select a desired hub area 205 (i.e., associated with the transport hub 205H to be analyzed) among the ones stored in the repository 115.

Once the hub area 205 has been defined, the system 100 associates (block 305) a set of one or more cells 105b of the radio communication network 105 with the hub area 205.

Given the polygon that corresponds to the hub area 205, the cells 105b of the set may be selected according to:

1. a position of communication stations 105a of the radio communication network 105 with respect to the hub area 205, or 2. a coverage of the cells 105*b* with respect to the hub area 205.

In the first case, all the cells 105*b* served by a communication station 105*a* positioned within the hub area 205 are comprised in the set.

In the second case, all the cells 105*b* (which area is) at least partly superimposed to the hub area 205 are comprised in the set. In order to analyze superposition among the cells 105*b* and the hub area 205, the coverage of the cells 105*b* may be modelled by exploiting network planning software used by the network providers or may be determined by exploiting antenna radiation diagrams (e.g., as described in Theodore S. Rappaport, "Wireless Communications", Prentice Hall, 1996 on chapter 3, pages 69-138, and chapter 4, pages 139-196). Alternatively the coverage of the cells 105*b* may be modelled by means of Voronoi tessellation diagrams in which each Voronoi cell corresponds to a cell 105*b* of the radio communication network 105 (Voronoi tessellation diagrams are well known in the art, therefore they are not discussed further herein).

It should be noted that, selecting the cells 105*b* based on the coverage thereof is more comprehensive than considering the position of the communication stations 105*a*, since it allows considering also cells 105*b* having communication station 105*a* positioned outside the hub area 205 but able to serve UEs comprised in the hub area 205.

In case the hub area 205 has been defined as a point as mentioned above, all the cells 105*b* which are able to serve UEs over an area (i.e. coverage) comprising such point are associated with the hub area 205.

One or more 'dedicated' cells 105*b* (and/or dedicated WLAN access points, for example) may be deployed within the hub area 205 in order to insure/improve an availability of the telecommunication service therein (this because a large number of users with active User Equipment is generally expected within the hub area 205). In this case, such a set of one or more dedicated cells 105*b* is automatically associated with the hub area 205, in addition or in alternative to the cells 105*b* associated with the hub area 205 through the techniques described above. This results particularly useful when the identification of the cells 105*b* by means of the techniques described above requires an excessive computational effort for the system 100.

Preferably, the administrator interface 120 and, also preferably, the user interface 125 are configured for respectively allowing an administrator or a user to select, modify, delete and/or define one or more cells 105*b* associated with the hub area 205.

In the following, for the sake of simplicity, the hub area 205 is generally meant to comprise the geographic area delimited by the hub area 205, and the cells 105*b* of the mobile communication network 105 associated with the hub area 205. Similarly, the surveyed area 107 may be considered both in terms of geographic area and in terms of cells 105*b* of the mobile communication network 105 associated with the surveyed area 107 (i.e., cells 105*b* of the mobile communication network 105 providing radio communication services within the surveyed area 107).

Returning to the procedure according to the present invention, at block 307, a (category) counter $C_k$ (e.g., with k=A, B, C, D, E, F, G) is initialized by the system 100 to an initial value, preferably equal to zero, for each category of individuals that is considered (i.e., seven counters in the example at issue).

Then, at block 311, the system 100 retrieves event records $er_v$ stored in the repository 115. Preferably, the system 100 retrieves one group $erg_n$ of event records $er_v$ generated by a same UE n during the observation time period $T_{obs}$ previously specified.

More specifically, the system 100 (in particular the computation engine 10) initializes a UE variable n (e.g., n=0, . . . , N, N≥0; block 309) and then retrieves (block 311), e.g. sequentially, from the repository 115 a corresponding n-th event records group $erg_n$ therein stored for the UE currently associated with the variable n.

The events $e_v$ of the n-th event records group $erg_n$ are analyzed (decision block 313), e.g. preferably compared, with the patterns of events (Ap, Bp, Cp, Dp, $Ep_1$, $Ep_2$, $Ep_3$, $Fp_1$, $Fp_2$, and $Fp_3$) associated with respective categories A to F.

Whenever a match between an events pattern belonging to a generic category k and the sequence events $e_v$ of the n-th event records group $erg_n$ is found (exit branch Y of decision block 313), the corresponding counter $C_k$ is increased (block 315) by a predetermined amount, e.g. a unit.

In other words, in step 313, the individual associated with the n-th event records group $erg_n$ is identified as belonging to one of the category A-F corresponding to the identified events pattern.

In the negative case (exit branch N of decision block 313), the individual to which the events $e_v$ of the n-th event records group $erg_n$ is associated (block 317) is classified in category G and the counter $C_k$ corresponding to such category is increased (block 315) by a predetermined amount, e.g. a unit.

Then, the system 100 proceeds to block 319 where it checks whether the event records group $erg_n$ is the last event records group to be considered.

In the negative case (exit branch N of decision block 319), the UE variable n is incremented (block 321) by one (n=n+1) and the (next) (n+1)-th event records group $erg_{n+1}$ (referred to a different UE and individual) is retrieved (block 311).

In the affirmative case (exit branch Y of decision block 319), i.e. each event records group $erg_n$ in the repository 115 has been analyzed, the system 100 provides (block 324) analysis results (comprising or exploiting the category counters $C_k$) to the administrator, through the administrator interface 120, and/or to the user through the User Interface 125.

After such provision of the computation results the operation of the system 100 is concluded.

Afterwards, the user/administrator may use the computation results provided by the system 100 for his/her purposes. For example, the user/administrator can be provided with a set of computation results each of which referred to a considered category of individuals (for example, for each category, the set of computational results can comprise the value of the respective counter $C_k$ representing the number of individuals that are classified in that category over a considered observation time period $T_{obs}$). Possibly, also events patterns of a single individual (i.e., UE) of which the records group $erg_n$ has been analyzed can make available to the user/administrator for further processing.

This allows the user/administrator of the system 100, according to his/her needs, to automatically obtain desired information about, for example, numbers and purposes of individuals reaching/leaving the transport hub 205H.

Obviously, the procedure herein described may undergo many changes and modifications without departing from the scope of the present invention.

For example, the user (or the administrator) may optionally limit the search of patterns of events $e_v$ in such a way that only a subset of categories of individuals (e.g., subset of categories of individuals comprised among the categories of individuals A to G) are identified and analyzed.

It should be noted that the system 100 may further be exploited to perform and combine data analysis, counting and classifying people, referred to two or more observation time periods. Advantageously, the combination of results of data analysis referred to two or more observation time periods allows having a more complete overview of the travelling habits of individuals availing themselves of the services provided by the transport hub 205H. For example, it is possible to detect whether an individual that in a first observation time period is identified as to belong to category A takes a return trip to the hub area 205/surveyed area 107 by identifying such individual as belonging to category B during a successive observation time period. Moreover, it is possible to identifying sub-categories of individuals, such as for example frequent travelers, i.e. individuals that are identified as belonging to categories A and B, C or D during a predetermined number of considered observation time periods.

Further additionally or alternatively, it is possible to define sub-categories that comprise one or more events recorded at one or more predetermined locations, or Points of in Interest—PoI, in addition to the hub area 205, such as for example buildings (historical buildings, museums, government buildings, etc.), city squares, parks and/or other transport hubs comprised within the surveyed area 107.

Advantageously, the PoI may be defined—by the administrator or by the user of the system 100—as a point or as an area of the surveyed area 107, which may be associated with one or more cells 105b of the mobile telecommunication network 105 similarly as above described with respect to the hub area 205.

Further optionally, the user (or the administrator) may introduce an operating time of the transport hub 205H, e.g. a daily time period during which the transport hub 205H is fully functional and transport means arrive and depart therefrom.

For example, the official operating time period of the transport hub 205H may be considered. Preferably, time margins can be added to the official operating time period.

In an embodiment of the invention the considered daily time period is set starting 30 minutes before a first scheduled transportation means arrival or departure (e.g., the first airplane landing at, or flying from, the transport hub 205H) and ending 30 minutes after a last scheduled transportation means arrival or departure (e.g., the last airplane landing at, or flying from, the transport hub 205H).

Time margins allows taking into account that individuals arrive at the transport hub 205H earlier than the time of the scheduled departure or may stay at the transport hub 205H beyond the scheduled time of arrival.

Preferably, in case the (daily) operating time is considered, the events $e_v$ of a generic n-th event records group $erg_n$ happening outside (i.e., before or after) the operating time, but within the observation period, are automatically considered belonging to events patterns of the G category.

Further optionally, the system administrator (through the administrator interface 120) and, possibly, the user (through the user interface 125) may define new categories of individuals, or may define sub-categories for the preset categories A to G (obviously, one or more different events patterns are associated with each sub-category).

For example, the G category may be divided into two sub-categories: a first sub-category, e.g. G1, that comprises events patterns including one or more events $e_v$ detected in the surveyed area 107, but none in the hub area 205 (i.e., individuals that do not reach the transport hub 205H). Conversely, a second sub-category, e.g. G2, may comprise events patterns including one or more events $e_v$ in the hub area 205 (i.e., effectively un-categorized individuals that reached/leaved the transport hub 205H).

It should be noted that the system 100 might be adapted to retrieve (or receive) data about individuals not exclusively from a mobile telephony network 105. Alternatively or in addition, the system may be configured to retrieve (or receive) data about individuals from one or more wireless networks, such as WLANs, operating in the surveyed area 107, provided that the UE of the individuals are able to connect to such wireless communication networks.

The invention claimed is:

1. A method of counting individuals reaching or leaving a transport hub, said transport hub being comprised in a hub area included in a geographic area over which a mobile telecommunication network is adapted to manage communications of User Equipment to be used by individuals, the mobile telecommunication network being configured for recording event records each one indicating at least a time information and a position information of each event of interaction between the User Equipment and the mobile telecommunication network, the method comprising:

defining at least two categories of individuals, the individuals in each of the at least two categories having a common purpose for reaching or leaving the transport hub;

for each of the at least two categories, defining at least one respective category pattern associated with said each category, each category pattern being a sequence of events of interaction between the User Equipment and a communication station of the mobile telecommunication network;

acquiring event records associated with the User Equipment from the mobile telecommunication network;

searching the event records associated with each User Equipment of a pool of User Equipment for identifying sequences of events of interaction matching a category pattern of the at least one category pattern, and upon finding a match between a sequence of the sequences of events and the category pattern of the at least one category pattern, increasing a number of individuals belonging to the category associated with the category pattern of the at least one category pattern.

2. The method according to claim 1, wherein acquiring the event records associated with the User Equipment from the mobile telecommunication network comprises:

defining a predetermined observation time period, and acquiring the event records associated with the User Equipment having a time information referred to a time instant comprised in the predetermined observation time period.

3. The method according to claim 1, wherein acquiring the event records associated with the User Equipment from the mobile telecommunication network comprises:

defining the hub area as a portion of the geographic area comprising the transport hub, and acquiring the event records associated with the User Equipment whether at least one event record thereof has a position information referred to a position within the hub area.

4. The method according to claim 1, wherein defining the at least one category pattern of events associated with said each category comprises:

defining the at least one category pattern of events comprising at least one event recorded in a position within the hub area.

5. The method according to claim 4, wherein defining the at least one category pattern of events associated with said each category further comprises:
defining the at least one category pattern of events further comprising at least one event recorded in a position outside the hub area.

6. The method according to claim 5, wherein defining the at least two categories of individuals further comprises:
defining a departing category as a category of individuals that reach the transport hub for taking outgoing transportation, and
wherein defining the at least one category of events associated with each category comprises defining a departing category pattern, associated with the departing category, comprising:
a first events set comprising one or more consecutive events recorded outside the hub area, and
a second events set comprising a consecutive event recorded within the hub area, the second events set following the first event set.

7. The method according to claim 6, wherein the departing category pattern further comprises:
a third events set of one or more consecutive events recorded in the hub area, the third events set following the second events set, and
wherein a first time interval between a last event of the second events set and any event of the third events is set equal to, or lower than, a first predetermined permanence time period, and
a second time interval between consecutive events of the third events set is equal to, or lower than, a predetermined first threshold time period.

8. The method according to claim 5, wherein defining the at least two categories of individuals further comprises:
defining an arriving category as a category of individuals that reach the transport hub by exploiting transportation, and
wherein defining the at least one category of events associated with each category comprises defining an arriving category pattern, associated with the arriving category, comprising:
a first events set comprising a single event recorded within the hub area, and
a second events set comprising one or more consecutive events recorded outside the hub area, the second events set following the first events set.

9. The method according to claim 8, wherein the arriving category pattern further comprises:
a third events set comprising one or more consecutive events detected within the hub area, the third events set being comprised between the first events set and the second events set, and
wherein a third time interval between a first event of the third events set and any event of the first events set is equal to, or lower than, a predetermined first permanence time period.

10. The method according to claim 6, wherein defining the at least two categories of individuals further comprises:
defining a departing commuters category as a category of individuals that commute by exploiting the transportation for leaving and returning to the hub area, and
wherein defining the at least one category of events associated with each category comprises defining a departing commuters category pattern, associated with the departing commuters category, comprising:
first events set and second events set according to departing category pattern, and
a third events set comprising a single event recorded within the hub area, the third events set following the second events set, and
wherein a fourth time interval between the event of the third events set and a last event of the second events set is greater than a predetermined first threshold time period.

11. The method according to claim 10, wherein the departing commuters category pattern further comprises:
a fourth events set comprising one or more consecutive events recorded within the hub area, the fourth events set following the third events set, and
a fifth events set comprising one or more consecutive events recorded outside the hub area, the fifth events set following the fourth events set, and
wherein a fifth time interval between the event of the third events set and any event of the fourth events set is equal to, or lower than, a predetermined first permanence time period.

12. The method according to claim 8, wherein defining the at least two categories of individuals further comprises:
defining an arriving commuters category as a category of individuals that commute by exploiting the transportation for reaching and leaving the hub area, and
wherein defining the at least one category of events associated with each category comprises defining an arriving commuters category pattern, associated with the arriving commuters category, comprising:
first events set and second events set according to the arriving category pattern, and
a third events set comprising a single event recorded within the hub area, the third events set following the second events set, and
wherein a sixth time interval between the event of the third events set and a last event of the second events set is greater than a predetermined second threshold time period.

13. The method according to claim 12, wherein the arriving commuters category pattern further comprises:
a fourth events set comprising one or more consecutive events recorded within the hub area, the fourth events set following the third events set, and
wherein a seventh time interval between the event of the third events set and any event of the fourth events set is equal to, or lower than, a predetermined first permanence time period.

14. The method according to claim 8, wherein defining the at least two categories of individuals further comprises:
defining a non-traveler category as a category of individuals that reach the hub area but do not exploit the transportation, and
wherein defining at least one category of events associated with each category comprises defining a non-traveler category pattern, associated with the non-traveler category, comprising:
first events set and second events set according to departing category pattern, and
a third events set comprising one or more events recorded outside the hub area, the third events set following the second events set, or
first events set and second events set according to arriving category pattern, and a third events set comprising a single event recorded within the hub area, the third events set following the second events set of the arriving category pattern, and wherein an eight time interval between the event of the third events set of the arriving category pattern and a last event of the second events set of the arriving category pattern is equal to, or lower than, a predetermined second threshold time period, or the first events set, the second events set and the third events set according to the arriving category pattern, and a fourth events set comprising one or more events recorded outside the hub area, the fourth events set following the third events set of the arriving category pattern.

15. The method according to claim 12, wherein defining the at least two categories of individuals further comprises:

defining a personnel category as a category of individuals working at the transport hub, and wherein defining at least one category of events associated with each category comprises defining a personnel category pattern, associated with the personnel category, comprising:

first events set and second events set according to a departing category pattern, and a third events set comprising an event recorded within the hub area, the third events set following the second events set, and wherein a ninth time interval between the event of the third events set and a last event of the second events set is greater than a predetermined permanence time period, or the first events set comprising one or more event recorded within the hub area, and wherein a tenth time interval between events of the third events set is greater than the predetermined permanence time period, or first events set, second events set and third events set according to arriving commuters category pattern, and a fourth events set comprising one or more events recorded within the hub area, the fourth events set following the third events set, and wherein an eleventh time interval between the events of the fourth events set and a last event of the third events set of the arriving category pattern is greater than the predetermined permanence time period.

16. The method according to claim 2, wherein acquiring the event records associated with the User Equipment from the mobile telecommunication network further comprises:

defining at least one further predetermined observation time period, and acquiring event records associated with the User Equipment having a time information referred to a time instant comprised in the at least one further predetermined observation time period, and wherein searching the event records associated with each User Equipment of the pool of User Equipment for identifying the sequences of events of interaction matching a category pattern comprises, searching the event records associated with the User Equipment having a time information referred to a time instant comprised in the at least one further predetermined observation time period for identifying a respective at least one further sequence of events of interaction matching at least one further category pattern, and upon finding a match between the at least one further sequence of events and a category pattern, identifying an individual user of the User Equipment as belonging to a predetermined sub-category based on the category pattern and on the at least one further category pattern found.

17. The method according to claim 1, further comprising defining a selected portion of the geographic area other than the hub area as a point of interest, and wherein acquiring the event records associated with the User Equipment from the mobile telecommunication network comprises acquiring the event records associated with the User Equipment whether at least one event record thereof provides a position information associated with a position within the point of interest.

18. A system coupled with a mobile telecommunication network for counting of individuals reaching or leaving a transport hub, the system comprising:

a computation engine configured to process data retrieved from the mobile telecommunication network;

a repository configured to store data regarding interactions between the User Equipment and the mobile telecommunication network, computation results generated by the computation engine and any processing data generated by and/or provided to the system;

an administrator interface configured to modify parameters and/or algorithms used by the computation engine and/or accessing data stored in the repository, and a memory element storing computer-readable instructions that, when executed, perform the method of claim 1.

* * * * *